United States Patent [19]

Jakl et al.

[11] 4,167,123

[45] Sep. 11, 1979

[54] PROGRAM UNIT FOR ACCURATE ACTUATION AND CONTROL OF INDIVIDUAL OPERATIONS

[75] Inventors: Vladimir Jakl; Josef Cink; Filip Bacovsky, all of Sumperk, Czechoslovakia

[73] Assignees: Vyzkumny ustav lykovych vlaken Sumperk; Strojni a traktorova stanice v Zatci, narodni podnik Zatec Corporation, Czechoslovakia

[21] Appl. No.: 795,863

[22] Filed: May 11, 1977

Related U.S. Application Data

[63] Continuation-in-part of Ser. No. 775,846, Mar. 9, 1977, abandoned.

[51] Int. Cl.² ............................................. F16D 27/10
[52] U.S. Cl. .................................................. 74/125.5
[58] Field of Search ................................ 74/125.5, 55

[56] References Cited

U.S. PATENT DOCUMENTS

| | | | |
|---|---|---|---|
| 919,006 | 4/1909 | Hancock | 74/125.5 |
| 2,226,917 | 12/1940 | Zeruneith | 74/125.5 X |

*Primary Examiner*—Francis K. Zugel
*Attorney, Agent, or Firm*—Burgess, Ryan and Wayne

[57] ABSTRACT

A programmed actuation and an accurate stoppage of a mechanism in a predetermined position after performance of a predetermined number of revolutions is achieved by provision of a main shaft driven through a claw clutch and of an auxiliary shaft driven from the main shaft through a transmission, the auxiliary shaft having actuating means for disconnecting the claw clutch after a number of revolutions of the main shaft determined by the transmission ratio of both shafts.

1 Claim, 4 Drawing Figures

PROGRAM UNIT FOR ACCURATE ACTUATION AND CONTROL OF INDIVIDUAL OPERATIONS

This application is a continuation-in-part of prior U.S. patent application Ser. No. 775,846, filed Mar. 9, 1977 (now abandoned) and assigned to the assignee of the instant application.

BACKGROUND OF THE INVENTION

The invention relates to a program unit for accurate actuation and control of individual operations of a mechanism particularly for machines performing a number of operations simultaneously.

For the intermittent transmission of a torque different kinds of clutches are used, for instance claw clutches, centrifugal, friction and electromagnetic clutches and others with different control methods. A drawback of these clutches is that the position of their disengagement cannot be accurately adjusted, as their run down characteristics vary. The extent of run down depends substantially on the load. When coupled to a substantial load, the clutch can stop practically instantaneously; without load there is a longer run down time.

SUMMARY OF THE INVENTION

It is an object of this invention to provide a program unit, enabling the adjustment of a predetermined number of revolutions of a shaft and stopping this shaft in a predetermined angular position. According to this invention a through shaft is provided on one end with a stable part of a claw clutch and with a slidable part of a claw clutch, while on the other end of this through shaft a driving toothed wheel is fixed, meshing with a driven toothed wheel supported on a back shaft, on the other end of which a copying disk is fixed, a copying pin engaging a recess of the copying disk and being disposed on the lower arm of a forked lever, which is pivotably supported by a bolt, the upper arm of this forked level being provided with an adjustable stop bearing against the surface of a disconnecting disk fixed on a slidable sleeve, through which the through-shaft is passing and on the other end of which sleeve the slidable part of the claw clutch is fixed.

The program unit for accurate actuation and control of individual operations according to this invention enables the generation of an accurate number of revolutions and an accurate stoppage of transmission of torque at a predetermined place. The number of transmitted revolutions can be optionally adjusted within a wide range by changing the transmission ratio between the through shaft and the back shaft. After transmission of the predetermined number of revolutions to the working unit, the program unit comes to a stop in its starting position. The program unit enables the control of a number of other units simultaneously with accurate performance of all required operations, which can follow each other or which can overlap. If more such program units are provided, the unit with the first operating impulse becomes the control unit, which after starting operation subsequently cuts in other units, with the possibility of overlapping of performances or operations. The controlled program units can be arranged around the control unit in a circle or they can be in line, whereby the first unit is the control unit.

DESCRIPTION OF PREFERRED EMBODIMENT

Figure 1:
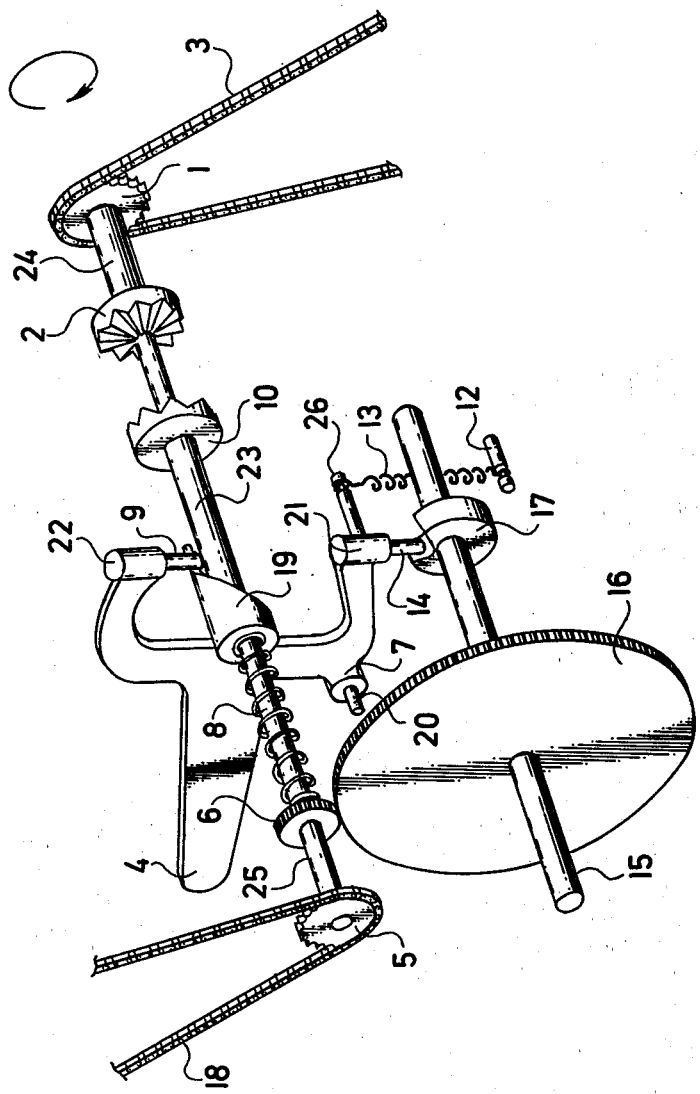
FIG. 1 shows a program unit according to a side elevation view of a preferred embodiment of the invention.
Figure 2C:
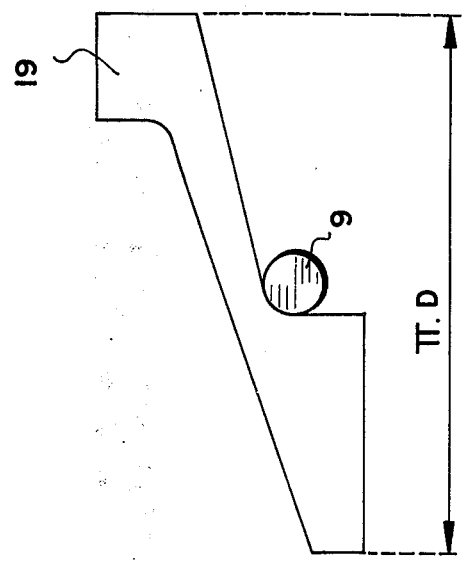
FIG. 2c is a top plan view of the disconnecting disk and associated stop pin.
Figure 2B:
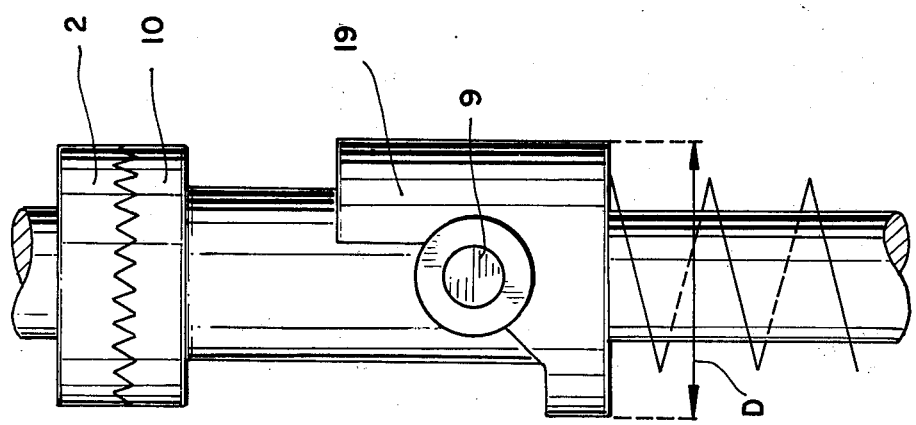
FIG. 2b is a top plan view showing said disconnecting disk and associated elements, in a position where the claw clutch is engaged.
Figure 2A:
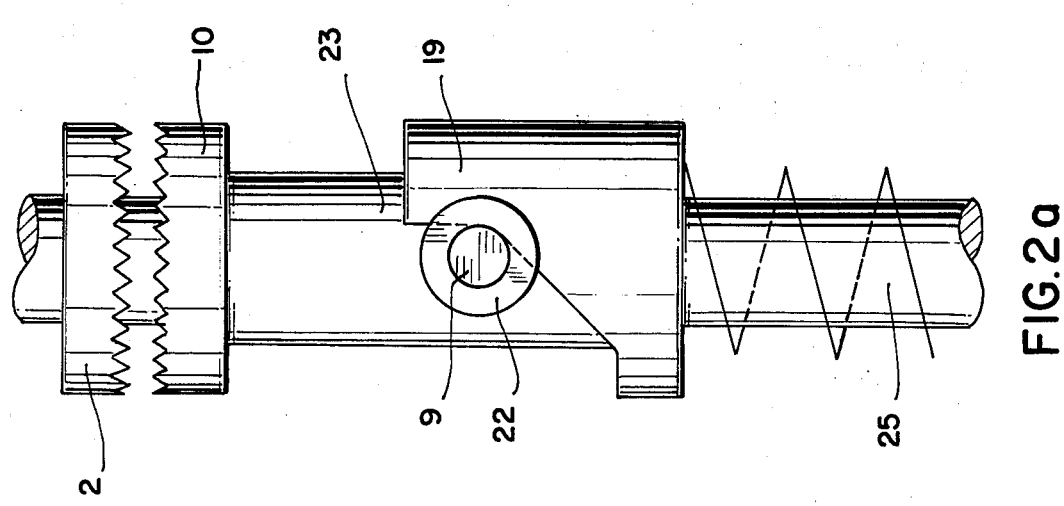
FIG. 2a is a top plan view of the disconnecting disk utilized in the arrangement of FIG. 1, and mechanical elements associated therewith, in a position in which the claw clutch of FIG. 1 is disengaged.

A through-shaft 25 is rotatably supported by suitable bearings (not shown). On one end of the shaft 25 a sleeve 24 is rotatably disposed. A chain wheel 1 and a stable part 2 of a claw clutch are fixed to opposite ends of the sleeve 24 for rotation therewith.

The sleeve 24 may be slidably mounted on the shaft 24, or may be coupled thereto by suitable roller or ball bearings. The slidable part 10 of the claw clutch and a disconnecting disk 19 are fixed to opposite ends of a sleeve 23 which is slidably mounted on the through-shaft 25. That is, the sleeve 23 is slidably mounted on, but rotatable with the shaft 25. If desired, the sleeve 23 may be splined on the shaft 25. The disconnecting disk has a helical or spiral outer cam configuration. A gear or toothed wheel 6 and a chain wheel 5 are fixed on the other end of the through-shaft between the disk 19 and wheel 16, bearing with one end against the toothed wheel 6, with its other end against the disconnecting disk 19 to urge said disk away from said wheel. A bolt 20 is situated on and secured to a fixed support (not shown), with a forked lever 4 rotatably mounted on the bolt 20 by its sleeve 7. The upper arm 22 of the forked or bifurcated lever 4 is provided with an adjustable stop 9, whereas the lower arm 21 of the lever 4 has a copying pin 14 secured thereto and a bolt 26 extending therefrom. A pull spring 13 is suspended at one end of the bolt 26, the other end of the spring 13 being fixed to a stable bolt 12 which in turn is secured to a fixed support (not shown). The toothed wheel or gear 6 meshes with a driven toothed wheel or gear 16 supported on a back shaft 15, on the other end of which back shaft copying disk or cam 17 is fixed. The shaft 15 is mounted for rotation. The chain wheel 1 is connected by means of a driving chain 3 with a driving means such as a motor (not shown). The chain wheel 5 on the other end of the through-shaft 25 is connected with working units or driven members (not shown) by means of a driving chain 18.

The program unit is designed for intermittent transmission of a torque for more complicated machines, performing several operations simultaneously or operations overlapping in time. The unit is therefore designed for transmission of the torque to parts of an arrangement or mechanism which cooperates with another arrangement or mechanism. The torque is transmitted from a driving means (not shown) to rotate the sleeve 24 in the direction of the arrow 30. The chain wheel 1, the driving part 2 of a claw clutch and the sleeve 24 are freely rotatable on the through-shaft 25.

If it is desired to transmit torque from the chain 3 to the chain 18 by way of the through shaft 25, the forked lever 4 is rotated counterclockwise about the bolt 20 by a mechanical impulse applied thereto from another device (not shown), bringing the copying pin 14 on the lower arm 21 of the forked lever 4 out of engagment with the copying disk 17; simultaneously, the adjustable stop 9 on the upper arm 22 of the forked lever 4 releases the disconnecting disk 19, enabling the pressure spring 8 to urge the slidable driven part 10 of the claw clutch into engagement with its stable driving part 2, so that the revolutions of the sleeve 24 are transmitted to the through-shaft 25.

The toothed wheel 6 rotates together with the through-shaft 25, transmitting the rotating motion to the toothed wheel 16 on the back-shaft 15 and to the copying disk 17. The copying pin 14 allows the toothed wheel 16 to perform a single turn only, whereafter the pin 14 enters a recess on the circumference of the copying disk 17 under the influence of the spring 13, locking any further movement of the toothed wheel 16 and thus also any operation of the program unit.

Simultaneously with the engagement of the copying pin 14 into the recess of the copying disk 17 the upper arm 22 of the forked lever 4 is rotated clockwise and deviated downwards, so that its adjustable stop 9 leans against the surface of the disconnecting disk 19 which has a helical shape, overcomes the pressure of spring 8 and, by cam action between the stop 9 and the ramp or outer helical contour of the disconnecting disk 19, causes said disk to move away from the driving part 2 of the clutch, and thus disengages the slidable part 10 of the claw clutch from its stable part 2. Thus, the transmission of torque via the program unit is interrupted.

The driving chain wheel 1 and the stable part 2 of the claw clutch, however, continue to turn on the now stationary through-shaft 25. The adjustable stop 9 rests against a stop (not shown) on the extremity of the helical surface of the disconnecting disk 19. The number of revolutions transmitted by the program unit is determined by the transmission ratio between the toothed wheel 6 on the through-shaft 25 and the driven toothed wheel 16 on the back-shaft 15. This transmission ratio can be optional and can be changed by means of intermediate wheels whereby, however, the driven toothed wheel 16 can in the course of one operation make a single turn only and the chain wheel 5 transmitting the torque to the working units performs a number of revolutions determined by the transmission ratio.

The disconnecting disk 19 has a helix extending through an angle of less than 360° and its inclination depends upon the transmission torque of the shaft 25. The helix is milled perpendicularly to the rotation axis of the disconnecting disk 19. The length of the helix on the disconnecting disk 19 must be larger than the depth of the indent engagement of claw clutch parts 2 and 10. The required length of the helix is adjusted by making it as an unfinished helix.

The drawing shows the clutch parts 10 and 2 disconnected. Due to an impulse of the forked lever 4 the adjustable stop pin 9 is disengaged from the disconnecting disk 19 and the spring 8 shifts the sleeve 23 with the clutch part 10 into its engagement with the clutch part 2, said impulse simultaneously bringing the copying pin 14 of the copying disk 17 out of engagement therewith, thus starting the mechanism of the program unit. The shaft 25 turns only once (that is, if the transmission ratio between the toothed wheels 6 and 16 is 1:1) in order to disengage clutch parts 10 and 2.

The adjustable stop pin 9 is situated so as to enable in case of disengagement and engagement into the helix of the disconnecting disk 19 a turning of the shaft 25 at least for one revolution.

What is claimed is:

1. A program unit for accurate actuation and control of individual operations comprising in combination:
    a rotatable through shaft,
    a first sleeve rotatably mounted on one end of said through shaft,
    a claw clutch having a stable part fixed on one end of said sleeve and a slidable part selectively engageable with said stable part,
    means for coupling said through shaft to a working unit for rotation therewith,
    a back-shaft parallel to said through-shaft,
    a first toothed wheel mounted on said through-shaft adjacent the other end thereof,
    a second toothed wheel and a copying disk provided with a recess on its circumference fixed on said back-shaft for rotation therewith, the second toothed wheel meshing with the first toothed wheel,
    a disconnecting disk having a helical or spiral cam configuration,
    a second sleeve slidably supported on the through shaft and mounted for rotation therewith, the slidable part of said claw clutch and said disconnecting disk being fixed on said second sleeve for rotation therewith,
    a fixed bolt,
    a forked lever pivotably supported on said fixed bolt, said lever having two arms,
    said means for coupling said shaft to a working unit being selectively activated by a mechanical impulse on said forked lever,
    a copying pin secured to one arm of said forked lever, the other arm of said lever having an adjustable stop pin adapted for selective engagement with said disconnecting disk,
    a first spring for urging said copying pin against said copying disk, and
    a second spring for urging said slidable claw clutch part toward said stable claw clutch part to engage said clutch,
    said stop pin engaging said disconnecting disk cam configuration and said copying pin engaging said copying disk recess in an uncoupled mode of said unit, said lever being rotatable by said mechanical impulse to move said pins away from said disks and recess to allow said second spring to engage said clutch parts for a single revolution of said copying disk, said copying pin thereafter being urged into said recess by said first spring and causing said stop pin to engage said helical or spiral configuration of said disconnecting disk to move said slidable clutch part away from said stable clutch part on roatation of said disconnecting disc.

* * * * *